US009336794B2

(12) United States Patent
Ben et al.

(10) Patent No.: US 9,336,794 B2
(45) Date of Patent: *May 10, 2016

(54) CONTENT IDENTIFICATION SYSTEM (71) Applicant: Alcatel-Lucent USA Inc., Murray Hill, NJ (US)

(72) Inventors: Jan I. Ben, Lawrenceville, NJ (US); Christopher J. Burges, Bellevue, WA (US); Madjid S. Mousavi, Lawrenceville, NJ (US); Craig R. Nohl, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,450

(22) Filed: Nov. 11, 2014

(65) Prior Publication Data

US 2015/0134329 A1    May 14, 2015

Related U.S. Application Data (63) Continuation of application No. 10/629,486, filed on Jul. 29, 2003, now Pat. No. 8,918,316.

(51) Int. Cl.
*G10L 15/00* (2013.01)
*G10L 25/48* (2013.01)
(Continued)

(52) U.S. Cl.
CPC ............... *G10L 25/48* (2013.01); *G11B 27/11* (2013.01); *G11B 27/28* (2013.01)

(58) Field of Classification Search
USPC ............................................... 704/231–254
See application file for complete search history.

(56) References Cited

U.S. PATENT DOCUMENTS 4,677,466 A    6/1987    Lert, Jr. et al.
6,314,391 B1   11/2001   Tsutsui et al.
(Continued)

FOREIGN PATENT DOCUMENTS

CN    1397929       2/2003
EP    1 403 783 A2  3/2004
(Continued)

OTHER PUBLICATIONS

English Translation of Examiners Office Letter for Japanese Patent Application No. 2004-221250, dispatch date May 31, 2010, pp. 1-6.
(Continued)

*Primary Examiner* — Leonard Saint Cyr
(74) *Attorney, Agent, or Firm* — Tong, Rea, Bentley & Kim, LLP (57) ABSTRACT The content of a media program is recognized by analyzing its audio content to extract therefrom prescribed features, which are compared to a database of features associated with identified content. The identity of the content within the database that has features that most closely match the features of the media program being played is supplied as the identity of the program being played. The features are extracted from a frequency domain version of the media program by a) filtering the coefficients to reduce their number, e.g., using triangular filters; b) grouping a number of consecutive outputs of triangular filters into segments; and c) selecting those segments that meet prescribed criteria, such as those segments that have the largest minimum segment energy with prescribed constraints that prevent the segments from being too close to each other. The triangular filters may be log-spaced and their output may be normalized.

21 Claims, 6 Drawing Sheets (51) Int. Cl.
*G11B 27/11* (2006.01)
*G11B 27/28* (2006.01)

(56) References Cited

U.S. PATENT DOCUMENTS

| | | | |
|---|---|---|---|
| 6,321,200 | B1 | 11/2001 | Casey |
| 6,453,252 | B1 | 9/2002 | Laroche |
| 6,633,845 | B1 | 10/2003 | Logan et al. |
| 6,907,367 | B2 | 6/2005 | Baggenstoss |
| 7,012,183 | B2 | 3/2006 | Herre et al. |
| 7,065,416 | B2 | 6/2006 | Weare et al. |
| 7,181,399 | B1 | 2/2007 | Rahim et al. |
| 2002/0099555 | A1 | 7/2002 | Pitman et al. |
| 2003/0055639 | A1 | 3/2003 | Rees |
| 2004/0059570 | A1 | 3/2004 | Mochinaga et al. |

FOREIGN PATENT DOCUMENTS

| | | |
|---|---|---|
| JP | H09-212166 | 8/1997 |
| JP | 2000-132177 | 5/2000 |
| JP | 2003-015684 | 1/2003 |
| WO | WO 03/009277 | 2/2003 |

OTHER PUBLICATIONS

English Translation of Japanese Examiner's Refusal Decision for Japanese Patent Application No. 2004-221250, dispatch date May 23, 2011, pp. 1-7.

English Translation of Japanese Hearing for Japanese Patent Application No. 2004-221250, dispatch date Jan. 25, 2012, pp. 1-5.

E-mail from Craig Nohl of Lucent Technologies, Subject: "Logo TraX system and Worldtrax", Mar. 20, 2001, to: Norman R. Shaer.

E-mail from Craig Nohl of Lucent Technologies, Subject: "Logo TraX Worldtrax trial dates", Apr. 17, 2001, to: Norman R. Shaer, Cc: Ben; Jan; Burges; Chris; Mousavi; Madjid.

E-mail from Craig Nohl of Lucent Technologies, Subject: "Logo TraX trial next steps", Apr. 5, 2000, to: nshaer, Cc:jib@wink.ho.lucent.com; cjcj@wink.ho.lucent.com; madjib@wink.ho.lucent.com.

E-mail from Craig Nohl of Lucent Technologies, Subject: "LogoTraX/M V1.0 (beta) ready", Dec. 20, 2000, to: Charlton R. Green; Norman R. Shaer, Cc: Ben; Jan; Mousavi; Madjid; Wood; Tom.

E-mail from Craig Nohl of Lucent Technologies, Subject: "LTX/M as LTX/A", Nov. 20, 2000, to: Norman R. Shaer, Cc: Chuck Green.

E-mail from Craig Nohl of Lucent Technologies, Subject: "WORLDTRAX", Feb. 18, 2000, to: nshaer.

E-mail from Craig Nohl of Lucent Technologies, Subject: "WORLDTRAX owings", Mar. 15, 2001, To: turck@aol.com, Attachment: WorldTraX oweing.doc, Attachment Title Outstanding Invoices for WorldTraX Media Incorporated as of Feb. 12, 2001, 2 pages.

E-mail from Craig Nohl of Lucent Technologies, Subject: "[Fwd: LogoTraX desktop machine]", Jul. 11, 2001, to: Craig Kelley, Cc: Mousavi, Madjid; Shaer; Wood; Thomas; Belyea.

E-mail from Craig Nohl of Lucent Technologies, Subject: "Re: LogoTraX desktop machine]". Mar. 26, 2001, to: Craig Kelley, Cc: Musavi; Madjid; Ben; Jan.

E-mail from Craig Nohl of Lucent Technologies, Subject: "LogoTraX/M product and service definitions]", Nov. 15, 2000, To: Charlton Greene; Norman Shaer, Cc: Ben; Jan; Mousavi; Madjid.

E-mail from Craig Keley of Lucent Technologies, Subject: "ASCAP", Feb. 15, 2001, To: Norm Shaer, Cc: Dick Gold; Rusty Doms.

E-mail from Craig Nohl of Lucent Technologies, Subject: "Contact for Logo TraX trial", Apr. 17, 2000, To: Ivan L. Belyea; Len W. York; Kevin Doran; Mark Rembisz; Meftali Birrueta; Kyle Peterson, Cc: Ben; Jan; Burge; Cris; Mousavi; Madjid; Shaer.

E-mail from Craig Keley of Lucent Technologies, Subject: "Re: LogoTraX", Mar. 21, 2001 To: Norm Shaer.

E-mail from Craig Keley of Lucent Technologies, Subject: "LogoTraX", Mar. 13, 2000, To: Norm Shaer, Attacment: "LogoTraX Deal Points.doc",8 pages.

Lucent Technologies Software Evaluation Request with attachment A, 4 sheets.

Haitsma, et al., "Robust audio Hashing for Content Identification", published at Content-Based Multimedia Indexing (CBMI) conference, 2001, Brescia, Italy.

Allamanche et al., "Content-based Identification of Audio Material Using MPEG-7 Low Level Description", *Proceedings Annual International Symposium on Music Information Retrieval*, Oct. 15, 2001, pp. 1-8, XP-002198244.

Ziyou Xiong et al., "Comparing MFCC and MPEG-7 Audio Features for Feature Extraction, Maximum Likelihood HMM and Entropic Prior HMM for Sports Audio Classification", *Proceedings of the 2003 IEEE International Conference on Acoustics, Speech and Signal Processings*, vol. 3, Jul. 6, 2003, pp. 397-400, XP010650381.

Wotd et al., "Content-based Classification, Search, and Retrieval of Audio", *IEEE Multimedia, IEEE Computer Society, US*, vol. 3, 1996, pp. 27-36, XP002154735.

CONTENT IDENTIFICATION SYSTEM

CROSS-REFERENCE TO RELATED APPLICATION

This application is a continuation of pending U.S. patent application Ser. No. 10/629,486, filed Jul. 29, 2003, entitled "CONTENT IDENTIFICATION SYSTEM", which is currently pending and is hereby incorporated by reference herein in its entirety.

TECHNICAL FIELD

This invention relates to the art of identifying the content of a particular media program.

BACKGROUND OF THE INVENTION

There is a need in the media arts to automatically identify particular media programs that are presented. For example, in order to determine copyright royalties that are paid based on the number of times a song is publicly played, e.g., on the radio, it is, of course, preliminarily required to determine the number of times that the song is played. Most often, in the prior art, the number of plays is tabulated based on radio station play logs. However, since these logs are manually entered, there may be errors. Similarly, there is a need to keep track of the actual number of plays of various commercials, whether on radio or television, as well as other programs. For example, many actors receive so-called residual payments based on the number of times a program in which they appeared is played. It also may be desirable to determine and log which programs are played to monitor particular contractual obligations that specify a maximum number of plays for specific programs.

In the prior art, it was possible to identify the content of a media program being presented at any given time on a channel if the content of the media program had additional information identifying the program content embedded therein, or directly associated therewith. Disadvantageously, versions of the media program that do not have available the additional information cannot be identified.

U.S. Pat. No. 4,677,466 issued to Lert, Jr. et al. on Jun. 30, 1987 discloses a system that uses a signature extracted from multimedia content after a stability condition is detected to identify the multimedia content. Such a system does not require additional information to be added to the media program to be identified. Also, *Robust Audio Hashing for Content Identification* by Haitsma et al., published at Content-Based Multimedia Indexing (CBMI) conference of 2001 in Brescia, Italy, and their believed corresponding United States Patent Application Publication US 2002/2178410, disclose an automatic content recognition system based on hashing that does not require additional information to be added to the media program to be identified. These systems have not, as of yet, achieved commercial success.

SUMMARY OF THE INVENTION

We have recognized that the content of a media program can be recognized with a very high degree of accuracy based on an analysis of the content of the media program without any added information provided that the media program has been previously appropriately processed to extract therefrom, and store in a database, features identifying the media program. This is achieved by analyzing the audio content of the media program being played to extract therefrom prescribed features, which are then compared to a database of features that are associated with identified content. The identity of the content within the database that has features that most closely match the features of the media program being played is supplied as the identity of the program being played.

The features of a media program may be extracted for storage in a database from an available, conventional, frequency domain version of various blocks of the media program in accordance with an aspect of the invention, by a) filtering the frequency domain coefficients to reduce the number of coefficients, e.g., using triangular filters; b) grouping T consecutive outputs of triangular filters into what we call "segments", where T may be fixed or variable; and c) selecting ones of those segments that meet prescribed criteria. In one embodiment of the invention, the prescribed criteria are that the selected segments have the largest minimum segment energy with prescribed constraints that prevent the segments from being too close to each other. Note that the minimum segment energy means the output of the filter within the segment that has the smallest value. In another embodiment of the invention, the prescribed criteria is that the selected segments have maximum entropy with prescribed constraints that prevent the segments from being too close to each other. The selected segments are stored in the database as the features for the particular media program.

In accordance with another aspect of the invention, the triangular filters are log-spaced. In accordance with yet another aspect of the invention, additional performance improvement may be achieved by normalizing the output of the log-spaced triangular filters.

The frequency domain version of the blocks of the media program may be derived in any conventional manner, e.g., 1) digitizing the audio signal to be analyzed; 2) dividing the digitized data into blocks of N samples; 3) smoothing the blocks using a filter, e.g., a Hamming window filter; 4) converting the smoothed blocks into the frequency domain, e.g., using a Fast Fourier Transform (FFT) or a Discrete Cosine Transform (DCT);

In accordance with the principles of the invention, the content of a media program may be identified by performing on the media program to be identified the same steps that are used to create the segments. Thereafter, the segments created from the content of the media program to be identified are sequentially matched against the segments of each media program stored in the database as part of a searching process. To speed up the searching process, when creating the database a particular segment of each media program in the database may be identified as the key segment for that media program, and each segment of the media program to be identified is first compared with the key segments for the media content stored in the database. When the segment of media program to be identified matches the key segment within a prescribed tolerance, further segments of the media program associated with the matching key segment are compared to further segments of the media program to be identified. A matching score is developed for each segment that is compared. In accordance with an aspect of the invention, the matching score may be a function of the Mahalonobis distance between the stored segments and the segments being compared. The identity of the program of the database that has the best matching score with the media to be identified is used as the identity of the media program to be identified. It is also possible that identification is not possible when no media program in the database is found to match the program to be identified with sufficient correlation.

In accordance with an aspect of the invention, advantageously, only a portion of a media program need be analyzed in order to identify the content of the entire media program. However, in order to avoid multiple identifications of the same media program because of similarity or identically of portions thereof, in accordance with an aspect of the invention, a duplication minimization process may be undertaken.

Advantageously, different versions of the same media program may be distinguished. For example, a plain song may be differentiated from the same song with a voice-over, thus allowing a commercial using a song in the background to be identified distinctly from only the song itself. Furthermore, various commercials using the same song can be uniquely identified. Additionally, an initial artist's rendition of a song may be differentiated from a subsequent artist's rendition of the same song. Another example is that a recoding of content at a first speed may be distinguished from the same recording but which was speeded up or slowed down, and the percentage of speed-up or slow-down may be identified as well.

Further advantageously, a media program will be properly recognized even if it is subject to so-called "dynamic range compression", also known as "dynamic gain adjustment".

Even further advantageously, a combined video and audio program, e.g., a television commercial, may be accurately identified solely from its audio content.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

In the description, identically numbered components within different ones of the FIGS. refer to the same components.

The present invention is an arrangement by which the content of a media program can be recognized based on an analysis of the content itself without requiring information to be embedded within the content being played, or associated therewith, prior to undertaking the identifying process.

Figure 1:
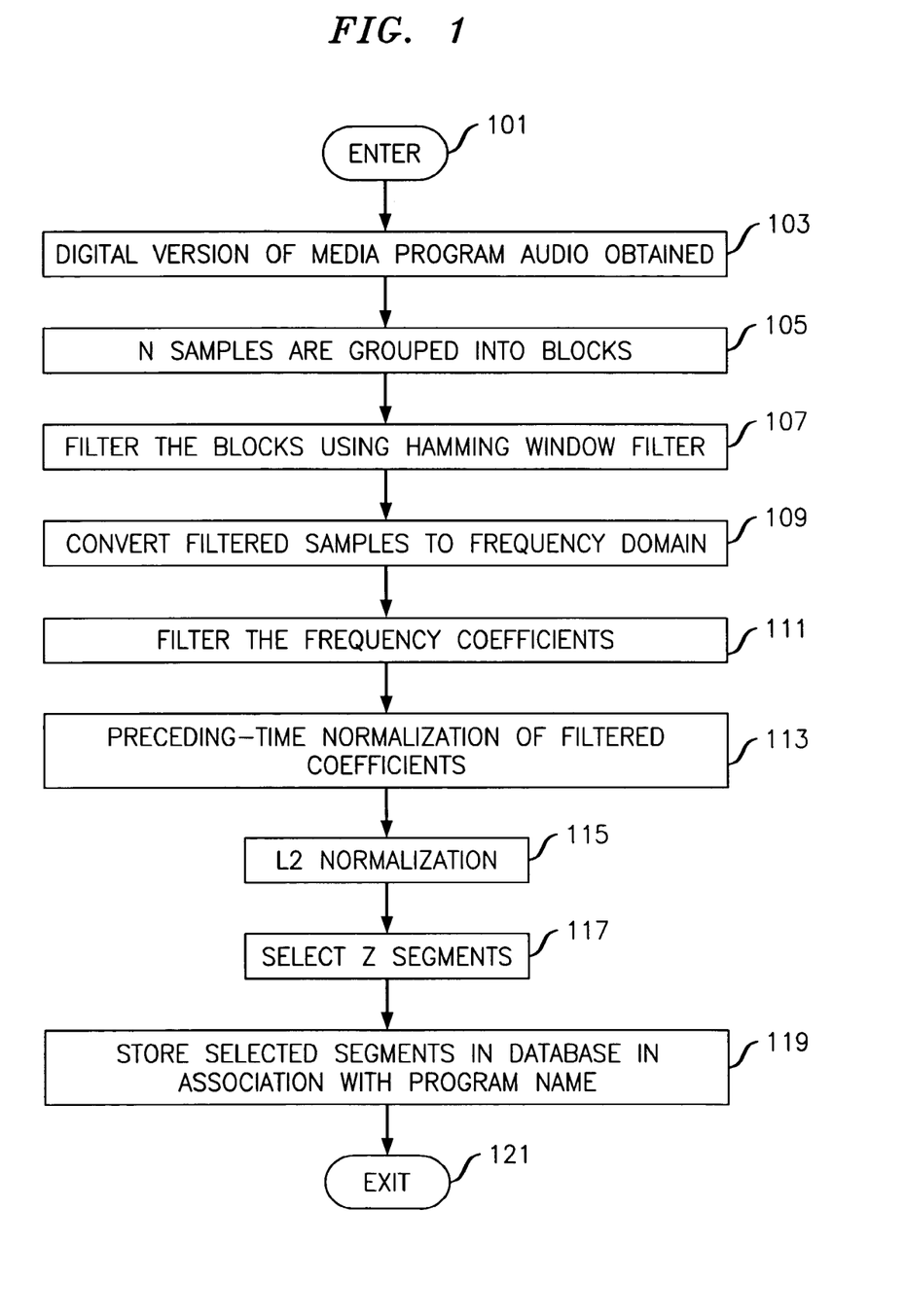
FIG. 1 shows a flow chart of an exemplary process by which the audio content of a media program is analyzed to extract therefrom prescribed features, which are then stored in a database of features associated with an identification of the content, in accordance with the principles of the invention.

FIG. 1 shows a flow chart of an exemplary process by which the audio content of a media program is analyzed to extract therefrom prescribed features, which are then stored in a database of features in association with an identification of the content, in accordance with the principles of the invention. Each audio content that can be identified by the instant inventive system must have an entry in the database of features. The process is entered in step 101 when a new audio content is to be added to the database.

Thereafter, in step 103, a digital, time domain, version of the audio signal of the media program is obtained and stored in a memory. In one embodiment of the invention, the audio content to be analyzed is supplied to a sound card of a computer, which digitizes the audio content and stores it in the computer's memory. It is then possible for the feature analysis to be performed by the computer on the digitized version of the audio content under the control of software. Alternatively, the audio content to be analyzed may be supplied to the computer already in digital form, in which case the digitizing may be skipped. However, if the analysis software expects the digitized version of the audio content to have a prescribed format, it may be necessary to convert the received digital audio content to that format.

Once a digital version of the audio signal of the media program is stored in memory, the samples thereof are grouped, in step 105, into blocks of length N, where N may be, for example, 1024. In optional step 107, the blocks are filtered to smooth the audio signal. Smoothing is advantageous to reduce the effect of the grouping that may adversely impact the separate conversion of the block to the frequency domain. One filter that may be employed is the Hamming window filter, although those of ordinary skill in the art will readily appreciate that other filters, e.g., Hanning window, may be employed.

The filtered samples of each block are respectively converted, in step 109, into frequency domain coefficients, thus producing a first frequency domain representation of the audio signal. This may be achieved, for example, using the well-known fast Fourier transform (FFT). Those of ordinary skill in the art will readily appreciate that other techniques may be employed to convert the time domain samples into frequency domain coefficients, e.g., using the discrete cosine transform (DCT). Also, instead of storing the entire digital version of the audio program in memory, only up to the length of time that corresponds to the block length need be stored at any one time, so that the conversion to the frequency domain may be performed for that block.

Thereafter, in step 111, the frequency coefficients of each block are filtered to reduce the number of coefficients, e.g., using a prescribed number, M, of log-spaced triangular filters, thereby producing a second frequency domain representation of the audio signal. Log-spaced triangular filters may be employed in applications where the audio content contains music, because the musical notes of the classical Western music scale are logarithmically spaced apart from each other, with a logarithmic additive factor of 1/12, i.e., $\log_2 f2 = \log_2 f1 + 1/12$, where f1 is the frequency of a note and f2 is the frequency of the next higher consecutive note.

Figure 2:
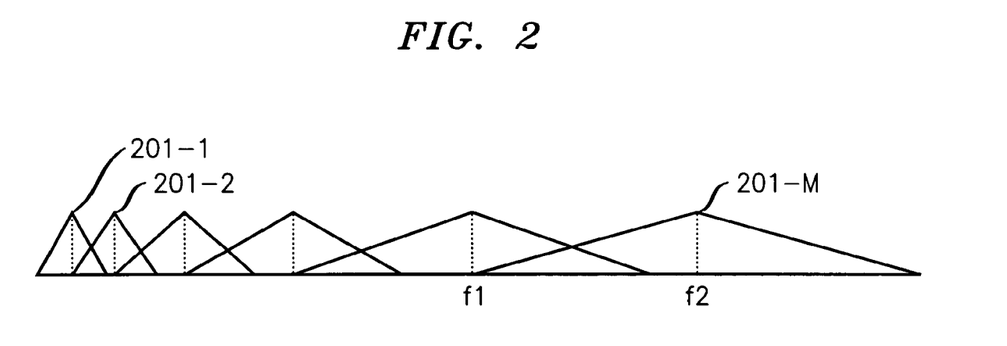
FIG. 2 shows a representation of the transfer function of M of log-spaced triangular filters.

FIG. 2 shows a representation of the transfer function of M of log-spaced triangular filters 201-1 through 201-M. As indicated, in the case of music it may be useful for the center frequency of each triangular filter to correspond to a musical note. Operationally, the coefficients within the frequency domain of each triangular filter are multiplied by the value of the filter's triangle at the coefficient's frequency location, and the resulting products within the frequency domain of each triangular filter are summed. The sum is supplied as the output of each filter. Note that some coefficients may contribute to the output of more than one filter. Also, preferably, each filter's domain begins at the frequency at the center of the domain of the filter immediately preceding it in frequency space. The prescribed number of filters employed for each block, M, in one embodiment is 30. Each filter supplies as its output a single resulting coefficient value derived from the coefficients input to it. The outputs of all of the M filters, taken collectively, are referred to as a frame. Grouping F, e.g., 12, consecutive in time frames together forms a group referred to as a segment. Using 12 frames per segment results in the segment corresponding to about 1 second of the original program at 11,025 samples per second. Note that although 11,025 samples per second is relatively low from an audio quality point of view, it is sufficient to achieve highly accurate recognition using the techniques disclosed herein and allows for real-time recognition processing.

Returning to FIG. 1, in accordance with an aspect of the invention, each sequentially produced segment is normalized, in optional step 113, using what we call "preceding-time" normalization, which is a scheme designed to facilitate future matching operations based on the Mahalonobis distance. In preceding-time normalization each reduced coefficient is normalized by subtracting from it the mean of all the reduced coefficients for a window having a number of frames that corresponds to a prescribed length of previous audio, e.g., S seconds, and dividing the resulting difference by the standard deviation which was calculated for all the frames making up the preceding S seconds. Mathematically, this may be represented as $$\hat{x} = \frac{x - \mu_Q}{\sigma_Q}$$

where $$\mu_Q = \frac{1}{Q} \sum_{i=t-Q}^{t} x_i$$

and $$\sigma_Q = \sqrt{\frac{\sum_{i=t-Q}^{t} (x_i - \mu_Q)}{Q}}$$

x is the output of the current triangular filter whose output is being normalized, $\hat{x}$ is the normalized value of the current triangular filter, μ is the mean of all the reduced coefficients for a window having a number of frames that corresponds to S seconds of previous audio, Q is the number of triangular filter outputs in S seconds of previous audio, t is the current time, σ is the calculated standard deviation.

Each normalized output is then further normalized, in step 115, using the well-know "L2" normalization, i.e., $$\hat{x}_j = \frac{\hat{x}_j}{\sqrt{\sum_{i=1}^{F \cdot M} \hat{x}_i^2}}$$

where i and j are indices used to point to appropriate ones of the normalized filter outputs incorporated in the frame. The segments, as they are produced, are temporarily stored.

In step 117, Z segments are selected from the temporarily stored segments. In one embodiment of the invention, the Z segments selected are those that have the largest minimum segment energy with the prescribed constraint that the selected segments have at least a user-specified minimum time gap between them. Note that the minimum segment energy means the filter output within the segment that has the smallest value. In another embodiment, the prescribed criteria is that the selected segments have maximum entropy with the prescribed constraints that prevent the segments from being too close to each other. One way of measuring entropy is by $$\sum_{i=1}^{F-1} \sum_{j=1}^{M} (x_{i,j} - x_{i+1,j})^2,$$

where $x_{i,j}$ is the output of the $j^{th}$ filter of the $i^{th}$ frame within the segment, F is the number of frames per segment, M is the number of filters.

The selected segments are prevented from being too close to each other so that, preferably, the segments are not all clustered in the same time period of the audio signal. The time spacing between the selected segments is also stored, so that the position of each segment in time within the program is known.

Figure 4:
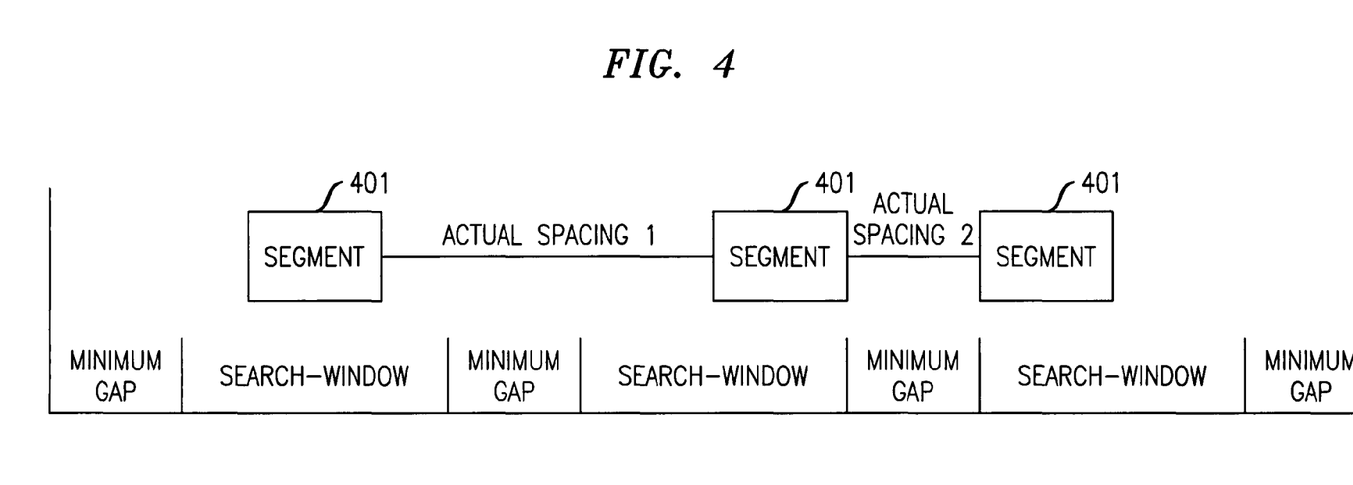
FIG. 4 shows a conceptual repeating structure of "gap search-window" with an additional gap at the end.

Use of the prescribed criteria that segments may not be too close to each other, suggests that there be gaps in time during which segments cannot be selected for storage in the database. Consequently, in accordance with an aspect of the invention, there are only certain, limited, time periods between the gaps from which the segments may be selected. Each of these limited time periods forms a "search window" over which a search for the segment to be selected is performed. Thus, the media program may be viewed as having a repeating structure of "gap search-window" with an additional gap at the end, e.g., as shown in FIG. 4. The search that is performed selects the segment that has the largest minimum segment energy of those segments within that search windows. Thus, the actual time spacing between two adjacent selected segments, e.g., segments 401, depends on the location of the selected segment within two adjacent search-windows and the user-specified minimum time gap between the search windows.

The number of segments, Z, is determined as follows:

$$Z = \text{FLOOR}\left(\frac{Nt - Ng}{Nw + Ng}\right) = \text{FLOOR}\left(\frac{Nt - Ng}{Ns + 3Ng}\right)$$

where:
Nt=total number of frames in the media program;
Ns=number of frames per segment, e.g. 12;
MIN_GAP_SECONDS is a user selected value indicating the minimum length of a gap in seconds, a useful value being 5 seconds when the program content is a song and each segment has a length of about 1 second. One second may be a useful value of MIN_GAP_SECONDS when the program content is relatively short, e.g., 30 seconds, such as for a commercial;
Ng=Number of frames per minimum gap, i.e., MIN_GAP_SECONDS multiplied by the sampling rate and divided by the number of samples per frame; and
Nw=the number of frames in a search-window, which is selected by the implementor to be 2Ng+Ns.

If the computed value of Z is greater than the maximum allowable number of segments, Nm, as selected by the user, then Z is capped at the maximum allowable number of segments. The number of gaps, G, can then be determined as follows: G=Z+1.

The value of Nm is selectable by the implementer based upon the particular application. For use with musical content such as songs, where each segment corresponds to about one second of music, a value of 30 for Nm has proved to be advantageous. For use with audio, or the audio content of, commercials, where the length of the program is typically much smaller than for musical content, e.g., the program may be only 30 seconds long in its entirety, a value of Nm in the range of 10-15 may be employed with shorter length segments, e.g., the length of the segments may be one-half or two-tenths of a second.

An implementer needs to keep in mind that selecting parameters that resulting in a larger value of Z will cause the application to run slower and/or require more computing power, although it may increase the accuracy In step 119, the Z selected segments are stored in a database file. The Z selected segments are stored in association with the name of the program, which may have been entered manually or it may be electronically obtained, e.g., using the well-known, Internet-based CDDB database. Stored segment number Z is referred to as the "key" segment.

The process then exits in step 121.

Figure 3:
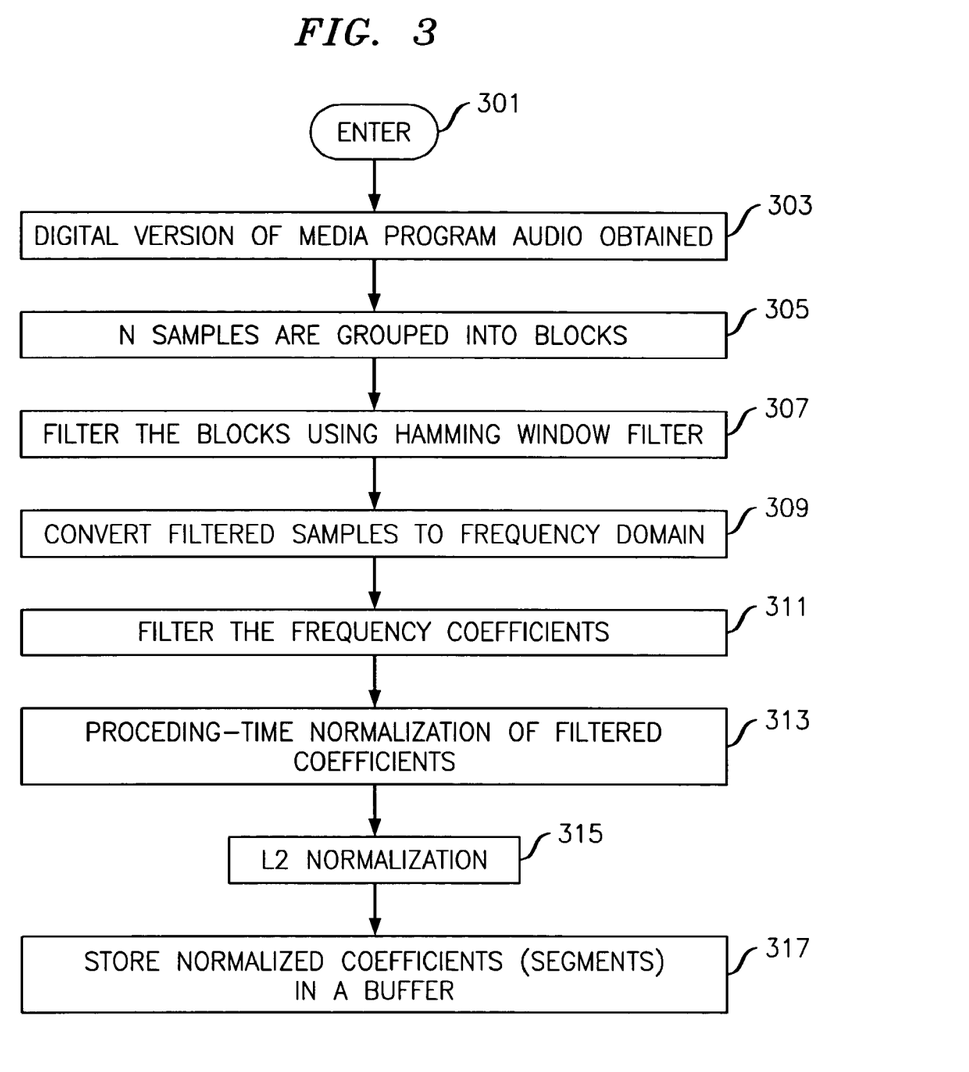
FIG. 3, shows a flow chart of an exemplary process by which the audio content of a media program is analyzed to extract therefrom prescribed features, which are then compared with features of various programs that are stored in a database in association with an identification of the content of the program, in accordance with the principles of the invention.
Figure 6:
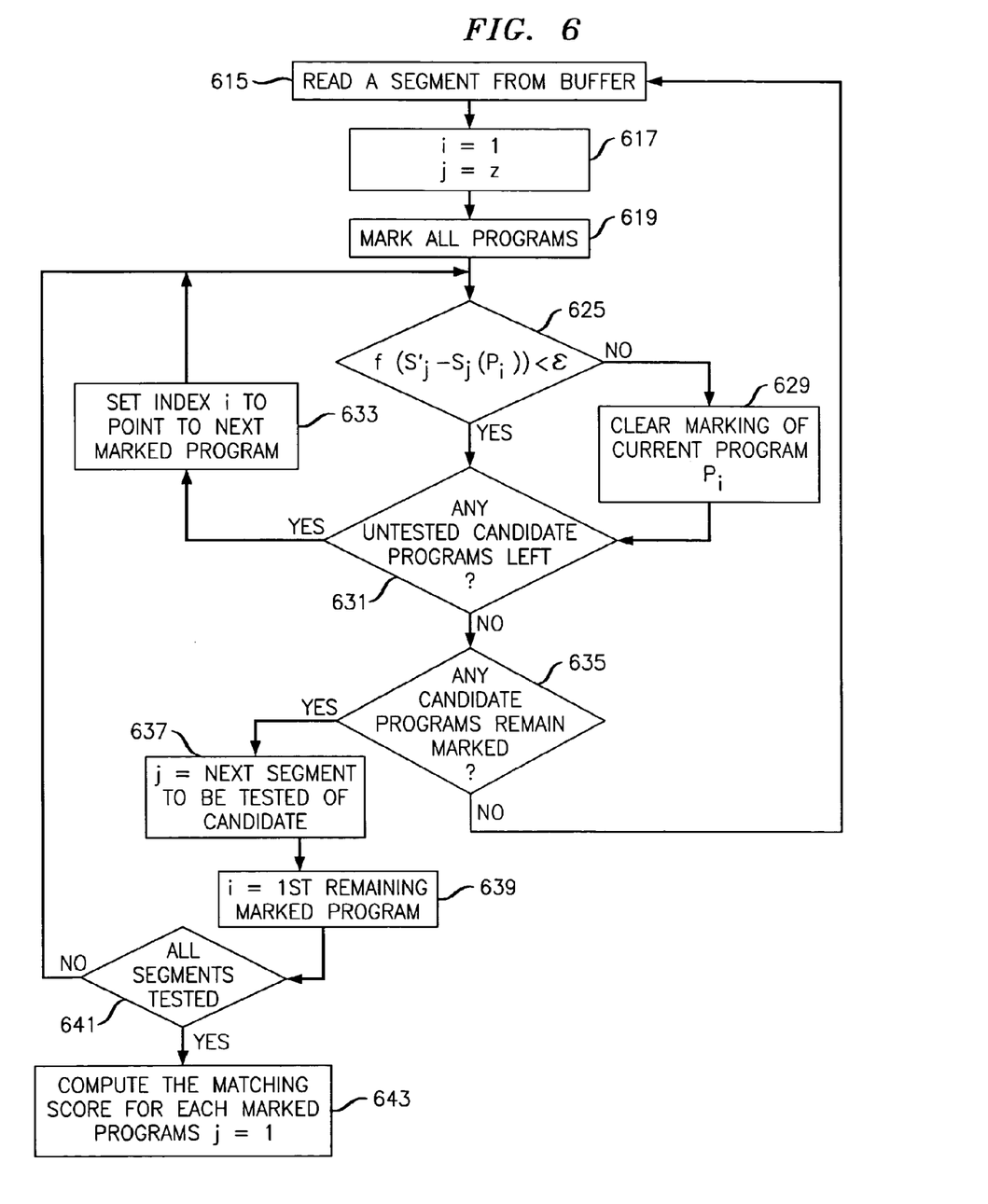
FIG. 6, shows a flow chart of an exemplary process by which the audio content of a media program is compared with features of various programs that are stored in a database in association with an identification of the content of the program, in accordance with the principles of the invention.

FIG. 3 shows an exemplary process for obtaining segments of a media program to be analyzed to extract therefrom prescribed features, which are then compared, e.g., using the process of FIG. 6, with features of various programs that are stored in a database in association with an identification of the content of the program, in accordance with the principles of the invention. The process of FIG. 3 is continuously run either indefinitely, e.g., when monitoring a broadcast, or until there it is know that there is no remaining portion of the media program to be analyzed that it has not processed, e.g., when the contents of a specific file is being analyzed. The process is entered in step 301 upon the start of the identification process.

Thereafter, in step 303, a digital, time domain, version of the audio signal of the media program to be identified is obtained and stored in a memory. In one embodiment of the invention, the audio content to be analyzed is supplied to a sound card of a computer, which digitizes the audio content and stores it in the computer's memory. It is then possible for the feature analysis to be performed by the computer on the digitized version of the audio content under the control of software. Alternatively, the audio content to be analyzed may be supplied to the computer already in digital form, in which case the digitizing may be skipped. However, if the analysis software expects the digitized version of the audio content to have a prescribed format, it may be necessary to convert the received digital form audio content to that format.

Once a digital version of the audio signal of the media program is stored in memory, the samples thereof are grouped, in step 305, into blocks of length N, where N may be, for example, 1024. In optional step 307, the blocks are filtered to smooth the audio signal. Smoothing is advantageous to reduce the effect of the grouping that may adversely impact the separate conversion of the block to the frequency domain. One filter that may be employed is the Hamming window filter, although those of ordinary skill in the art will readily appreciate that other filters, e.g., Hanning window, may be employed. The filtered samples of each block are respectively converted, in step 309, into frequency domain coefficients, thus producing a first frequency domain representation of the audio signal. This may be achieved, for example, using the well-known fast Fourier transform (FFT). Those of ordinary skill in the art will readily appreciate that other techniques may be employed to convert the time domain samples into frequency domain coefficients, e.g., using the discrete cosine transform (DCT). Also, instead of storing the entire audio program in digital form, only up to the length of time that corresponds to the block length need be stored. Doing so is likely to be preferred by most implementers.

Thereafter, in step 311, the frequency coefficients of each block are filtered to reduce the number of coefficients, e.g., using a prescribed number M of log-spaced triangular filters, thereby producing a second frequency domain representation of the audio signal. The number of filters employed, M, should match the number used when creating the segments stored in the database. In one embodiment of the invention, the number of filters employed is 30. Each filter supplies as its output a single resulting coefficient value derived from the coefficients input to it. As noted above, the outputs of all of the M filters, taken collectively, are referred to as a frame. Grouping F, e.g., 12, consecutive in time frames together forms a group referred to as a segment. Using 12 frames results in a segment corresponding to about 1 second of the original program at 11,025 samples per second.

In accordance with an aspect of the invention, the reduced coefficients supplied as outputs by the triangular filters are normalized, in optional step 313, using preceding-time normalization. Each normalized output is then further normalized, in step 315, using the well-know "L2" normalization. The segment is stored in a buffer, in step 317, for use in the comparison process. The minimum number of segments that need to be stored is at least Z, because at least Z segments must match the Z segments of an entry in the database for a match to be declared. However, it is advisable to store additional segments, because, as noted above, the selected segments in the database may have time gaps between them. In one embodiment of the invention, for identifying songs, it has been found sufficient to store 30 minutes worth of segments. This is because, at certain points in the matching process, the matching process may take more time than the segment obtaining process, e.g., when the key segment is matched, and so the matching process can fall behind the segment obtaining process, while at other points, e.g., when the key segments do not match, the matching process is faster than the segment obtaining process. Therefore, it is best to have a sufficiently large buffer so that the matching process has a chance to catch up.

FIG. 6, made up of FIGS. 6a and 6b, shows a flow chart of an exemplary process by which the audio content of a media program is compared with features of various programs that are stored in a database in association with an identification of the content of the program, in accordance with the principles of the invention.

Now that at least one segment of the program to be matched has been created and stored in the buffer, the matching process is undertaken using a sliding-window-with-verification comparison process based on the Euclidean distances between segments of the program to be matched and segments of programs stored in the database. Generally speaking, a segment of a program to be matched that is stored in the buffer that has not had any matches with a key segment is matched against each key segment in the database. Any key segment that matches the program segment to be matched by having the Euclidean distance between their segment values being within a prescribed range has its associated program marked, and subsequent comparisons will be made only for programs that are marked.

More specifically, the process is entered in step in step 615, in which the next previously-not-compared segment of the media program to be identified is obtained. Thereafter, in step 617 several indices that are used in the comparison are initialized. In particular, a) i, an index that points to a particular program in the database is initialized to 1; and b) j, a counter used in determining which segments are pointed to in program i and the media program to be identified, is initialized to Z, the number of segments for each program, which corresponds to the location of the key segments in the database. Thus, in one embodiment of the invention, in order for there to be a match, at least Z segments of the media program to be identified must be processed. Next, in step 619, all programs are marked to indicate that they are candidates for further comparisons.

Conditional branch point 625 tests to determine if a distance function between the currently pointed to segment of the media program to be identified and the currently pointed to candidate program $P_i$ in the database is less than a prescribed threshold. For example, the test determines if a distance function $f(S'_j - S_j(P_i))$ is less than $\epsilon_j$ where:

$S_j(P_i)$ is the stored jth segment of the current candidate program $P_i$ in the database which might correspond to the media program to be identified;

$S'_j$ is the segment of the media program to be identified that corresponds in time to the stored jth segment of the current candidate program $P_i$ in the database assuming the j=Z segment of the program to be identified corresponds to the key segment of the current candidate program $P_i$ in the database; and $\epsilon_j$ is an empirically calculated threshold for segment j of the current candidate program $P_i$ in the database. A method for determining $\epsilon_j$ will be described further hereinbelow.

When variation in the playback speed of the media program to be identified is not permitted, $S'_j$ can be determined directly from the match to the key segment and the timing information stored in the database describing the time spacing between segments of the current candidate program $P_i$. However, when variation in the playback speed of the media program to be identified is permitted, such variation in the playback speed may result in the identified location of the key segment in program to be identified being inexact, and the timing information not corresponding exactly to the timing of the media program to be identified. Therefore, a further search procedure may be required to identify each corresponding segment of the media program to be identified. To this end, a sliding window is defined around an initially identified location and the distance calculation is repeated with segments of the media program to be identified that are computed for each position in the window, and the position yielding the lowest distance is selected as the position of the segment. Advantageously, the amount of the speed variation, can be computed from the offsets determined by the searches for each segment as follows $$\text{speed }\% = \frac{-\Delta}{ExpectedLocation + \Delta} 100$$

where speed % is the percentage of variation in the playback speed, a negative value indicating a slowdown and a positive number indicating a speedup;

$\Delta$ is the difference between the actual location and the expected location as specified in the database, where a $\Delta$ greater than 0 implies a slowdown, because it takes more time to reach the segment in the media program to be identified than when the corresponding media program was processed for its segments to be stored in the database and a $\Delta$ less than 0 implies a speedup, because it takes less time to reach the segment in the media program to be identified than when the corresponding media program was processed for its segments to be stored in the database; and ExpectedLocation is the expected location of the segment as specified in the database.

In embodiments of the invention employing "preceding-time" normalization in step 113 and in which $S'_j$ and $S_j$ are each considered a vector in a multidimensional space, it is advantageous to employ the Mahalonobis distance. In other embodiments of the invention, the Euclidean distance may be employed.

If the test result in step 625 is NO, control passes to step 629, which clears the mark that indicated that the candidate program in the database should be considered for further comparisons. Therefore, the candidate program will no longer be considered for further comparisons. Control then passes to step 631. If the test result in step 625 is YES, control passes to directly step 631. Therefore, the mark that indicated that the current candidate program in the database should be considered for further comparisons remains set and the candidate program will continue be considered for further comparisons.

Conditional branch point 631 tests to determine if there are any remaining untested marked candidate programs. If the test result in step 631 is YES, indicating that there as yet remains untested marked candidate programs, control passes to step 633 in which index i is set to the next marked candidate program in the database. Control then passes back to step 625 and the process continues as described above. If the test result in step 631 is NO, indicating that all of the previously marked candidate programs have been tested, control passes to conditional branch point 635, which tests to determine if any candidate program remains marked. If the test result in step 635 is YES, control passes to step 637. If the test result in step 635 is NO, control passes back to step 615 to obtain the next previously-not-processed segment of the media program to be identified.

In step 637, the value of j is updated, e.g., decremented, to point to the next segment to be tested for the current candidate program, e.g., based on the stored segment timing information for the current candidate program. In step 639 i is reinitialized to point to the first remaining marked candidate program. Conditional branch point 641 tests to determine if all the segments have been tested, e.g., if j=0. If the test result in step 641 is NO, indicating that additional segments remain to be tested, control passes back to step 625. If the test result in step 641 is YES, indicating that all the segments have been tested, control passes to step 643, in which the matching score for each candidate program that remains marked is determined. In one embodiment of the invention, the matching score is determined by computing the average distance, e.g., matching score for program $$P_i = \frac{1}{z} \sum_{j=1}^{z} f(S'_j - S_j(P_i)),$$

and the scores are stored in a database in step 645.

At this point, the program to be identified could be declared to be the candidate of the database that has the best matching score, e.g., the lowest average distance, and doing so would yield reasonable results. The process would then continue again at step 615. However, it has been found that, in accordance with an aspect of the invention, that repeating the process over a prescribed period, e.g., 8 seconds, and logging all of the scores of each candidate that successfully reached step 645 for each iteration during the prescribed period and declaring as the program to be identified the candidate that achieved the best matching score over the prescribed period.

Figure 5:
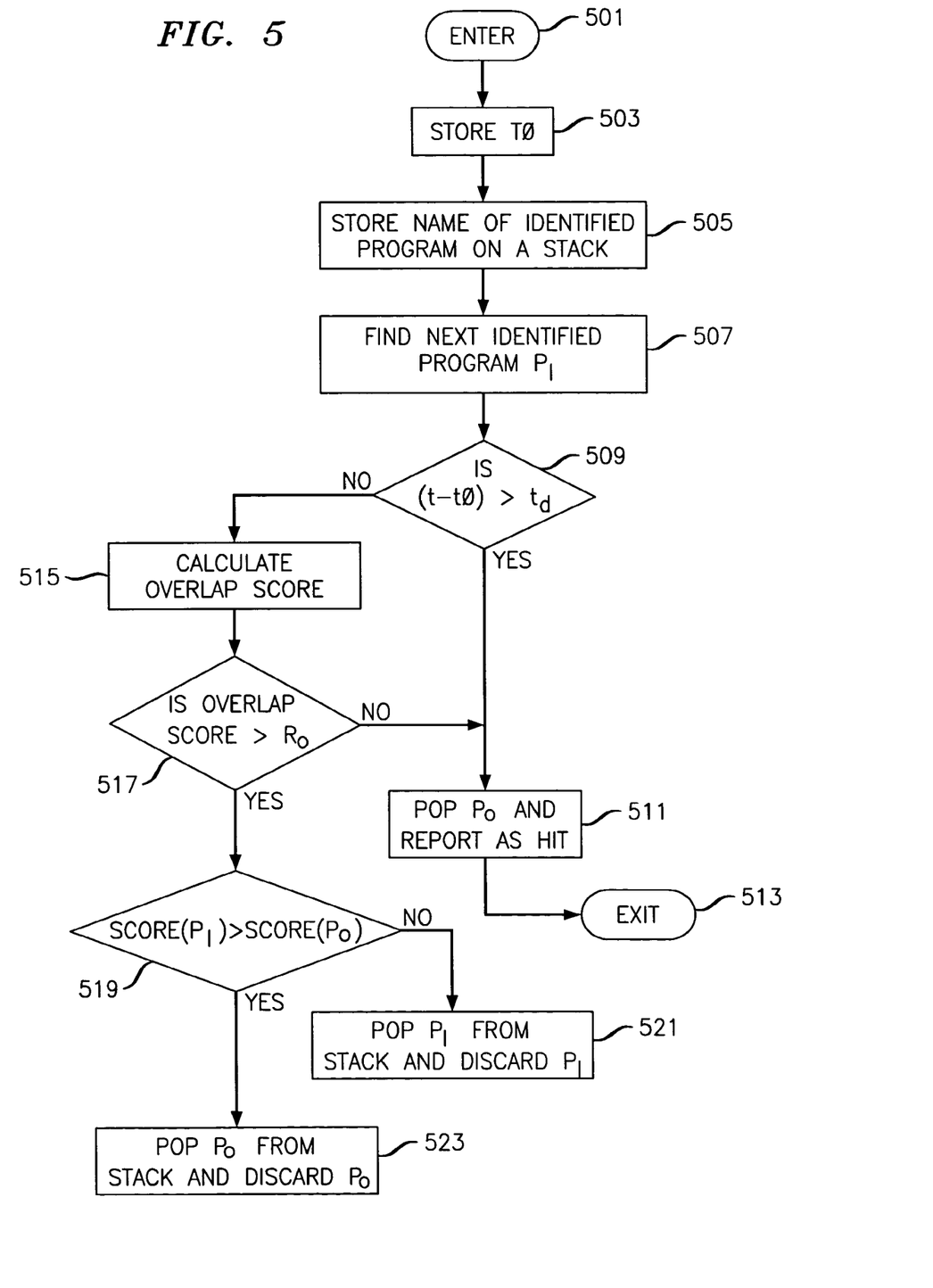
FIG. 5 shows an exemplary process to minimize the chances of falsely recognizing the same program as having been played multiple times when it was only played once, in accordance with an aspect of the invention.

Furthermore, to minimize the chances of falsely recognizing the same program as having been played multiple times when it was only played once, which might happen given the foregoing process when a substantial portion of the program is repeated, e.g., the chorus, the additional exemplary process shown in FIG. 5 may be undertaken, in accordance with an aspect of the invention.

The process is entered in step 501 once a program to be identified, has been identified as a particular program stored in the database, i.e., the program had a sufficiently good matching score over the prescribed period. Next, in step 503, the time of the segment in the program to be identified that corresponds to the key segment of the program stored in the database is stored in a variable T0. Thereafter, the initial determined identification of the program to be identified as retrieved from the database, P0, is stored in a stack, in step 505. The identification of the next program P1 is then determined in step 507, e.g., by performing the process of FIG. 3.

Conditional branch point 509 tests to determine if the time of the segment in the program next identified is greater than T0 by a prescribed threshold amount td. The prescribed threshold is set by the user based on considerations of the length of the longest program stored in the database, the maximum time between repetitions that are close enough to be distinctly identified as duplicate versions of a media program within a particular media program and the length of time that it is acceptable to delay reporting of the identification. In one application for identifying songs a value of td=120 seconds was found to be useful. Setting td to the length of the maximally long program in the database should improve freedom from duplicate identifications, although doing so takes the most time to report the identifications.

If the test result in step 509 is YES, indicating a sufficiently long time has elapsed such that the newly identified program should not be part of the previously identified program, control passes to step 511 in which the identification of the previous identified program P0 is popped from the stack and reported as the identification of the previous program. The process then exits in step 513.

If the test result in step 509 is NO, indicating a sufficiently long time has not elapsed so that the newly identified program may yet be part of the previously identified program, control passes to step 515, in which the overlap score between P0 and P1 is calculated. The overlap score, an indication of how much time is shared by P0 and P1, and is determined as Overlap score=$(t_{end}-t_{begin})$/(end time of P1−beginning time of P1)

where
$t_{end}$ is min(end time of P0, P1); and
$t_{begin}$ is max(beginning time of P0, P1).

Conditional branch point 517 tests to determine if the overlap score is greater than a prescribed threshold, Ro. The value of Ro may be experimentally determined by running the system with a variety of programs and selecting a value of Ro that yields the smallest number of duplicated identifications. One value of Ro that gives good performance for songs has been found to be 0.5.

If the test result in step 517 is NO, indicating that there is no, or at most a relatively small overlap, so that therefore it is likely that P1 is actually a distinct media program from P0, control passes to step 511 and the process continues as described above. If the test result in step 517 is YES, indicating that there is indeed a significant overlap between P0 and P1, control passes to conditional branch point 519 in which the matching scores for program P0 and P1 are compared. More specifically, conditional branch point 519 tests to determine if the matching score for P1 is greater than the matching score for P0. If the test result in step 519 is NO, indicating that the matching score for P1 is less than that for P0, control passes to step 521, in which P1 is discarded. Control then passes to step 513 and the process is exited. If the test result in step 519 is YES, indicating that the matching score for P1 is greater than that for P0, control passes to step 523, in which P0 is popped from the stack and discarded, and thereafter, in step 525, P1 is pushed on the stack in lieu of P0. Control then passes to step 513 and the process is exited.

Advantageously, using the processes of the instant invention different versions of the same media program may be distinguished. For example, a plain song may be differentiated from the same song with a voice-over, thus allowing a commercial using a song in the background to be identified distinctly from only the song itself. Furthermore, various commercials using the same song can be uniquely identified. Additionally, an initial artist's rendition of a song may be differentiated from a subsequent artist's rendition of the same song. Another example is that a recoding of content at a first speed may be distinguished from the same recording but which was speeded up or slowed down, and the percentage of speed-up or slow-down may be identified as well.

Further advantageously, a media program can be properly recognized even if it is subject to so-called "dynamic range compression", also known as "dynamic gain adjustment".

It is also possible that identification is not possible when no media in the database is found to match the program to be identified with sufficient correlation.

For one embodiment of the invention, the loose threshold was empirically determined using 109 country songs. More specifically, each of the 109 songs was processed so that its segments were stored in association with its name in a database, e.g., according to the process of FIG. 1. The 109 songs were then supplied as input to the system and Euclidean distances between segments of the playing song and each song recorded in the system was determined, i.e., by performing the method of FIG. 3 and of FIG. 6 up to step 643 but with the loose threshold $\epsilon_j$ being set to a very large number, so that every candidate always matches.

Once the distances were found, for each segment its loose threshold was found by determining $$\varepsilon_j = \frac{\mu_j(j+1) + \sigma_j\sqrt{j+1}}{j+1}$$

where $\mu_j$ is the mean of the distances computed for segment j and $\sigma_j$ is the standard deviation of the distances computed for segment j.

In one embodiment of the invention, when the 109 songs were supplied as input to the system to determine the Euclidean distances between segments of the playing song and each song recorded in the system, the songs are supplied via the same medium through which actual songs to be identified are supplied. For example, if the songs to be identified are songs broadcast via radio, then the songs supplied for use in determining the loose threshold are supplied via radio.

After its initial calculation, the loose threshold would only need to be calculated again when some of the system parameters are changed, e.g., the FFT size, the number of frames per segment, the sampling rate, the number of triangular filters, and so on. However, changing the content of the database should not require recalculation of the thresholds. For example, although the thresholds were initially calculated for country music, they have been found to be equally applicable to various other musical genres.

What is claimed is:

1. An apparatus for use in recognizing the content of a media program, the apparatus comprising:
    processing circuitry configured to digitize an audio representation of a media program to form a digitized audio representation of the media program;
    a memory configured to store the digitized audio representation of the media program; and
    a processor communicatively connected to the memory, the processor configured to:
        divide the digitized audio representation into time domain blocks of a prescribed number of samples;
        smooth the time domain blocks using a filter;
        convert the smoothed time domain blocks into frequency domain blocks, wherein the smoothed time domain blocks are represented by frequency coefficients;
        filter each first frequency domain representation of blocks of the media program using a plurality of filters to develop a respective second frequency domain representation of each of the blocks of the media program, the second frequency domain representation of each of the blocks having a reduced number of frequency coefficients with respect to the first frequency domain representation;
        group frequency coefficients of the second frequency domain representation of the blocks to form frequency coefficient segments;
        select a plurality of the segments as representing the media program;
        compare the selected segments to frequency coefficient segments of stored programs to provide corresponding matching scores; and
        determine the media program using the matching scores.

2. An apparatus for developing database information adapted for use in identifying an unidentified media program, the apparatus comprising:
    processing circuitry configured to digitize an audio representation of an identified media program to form a digitized audio representation of the identified media program;

a memory configured to store the digitized audio representation of the identified media program; and a processor communicatively connected to the memory, the processor configured to:

divide the digitized audio representation into time domain blocks of a prescribed number of samples;

smooth the time domain blocks using a filter;

convert the smoothed time domain blocks into first frequency domain blocks of respective frequency coefficients;

filter the first frequency domain blocks using a plurality of filters to develop respective second frequency domain blocks, the second frequency domain blocks having a reduced number of frequency coefficients with respect to the first frequency domain blocks;

group frequency coefficients of the second frequency domain blocks to form frequency coefficient segments;

select a plurality of the frequency coefficient segments as representing the identified media program; and store the selected frequency coefficient segments in a database so as to relate the selected frequency coefficients segments with an identifier of the identified media program.

3. The apparatus of claim 2, wherein a grouping of frequency coefficients of the second frequency domain blocks to form a respective one of the frequency coefficient segments includes second frequency domain blocks that are consecutive in time in the identified media program.

4. The apparatus of claim 2, wherein the selected frequency coefficient segments correspond to portions of the identified media program that are not contiguous in time.

5. The apparatus of claim 2, wherein the plurality of filters includes at least a set of triangular filters or at least a set of log-spaced triangular filters.

6. The apparatus of claim 2, wherein the selected frequency coefficient segments are those that have largest minimum segment energy.

7. The apparatus of claim 2, wherein the selected frequency coefficient segments are selected in accordance with prescribed constraints such that the selected frequency coefficient segments are separated by a minimum distance.

8. The apparatus of claim 2, wherein the selected frequency coefficient segments are selected to contain portions of the identified media program that correspond in time to prescribed search windows that are separated by gaps.

9. The apparatus of claim 2, wherein the selected frequency coefficient segments are those having a maximum entropy.

10. The apparatus of claim 2, wherein the processor is configured to:

normalize frequency coefficients forming the selected frequency coefficient segments.

11. The apparatus of claim 2, wherein the processor is configured to:

store, in the database, timing information associated with the selected frequency coefficient segments.

12. An apparatus for identifying an unidentified media program, the apparatus comprising:

processing circuitry configured to digitize an audio representation of the unidentified media program to form a digitized audio representation of the unidentified media program;

a memory configured to store the digitized audio representation of the unidentified media program; and a processor communicatively connected to the memory, the processor configured to:

divide the digitized audio representation into time domain blocks of a prescribed number of samples;

smooth the time domain blocks using a filter;

convert the smoothed time domain blocks into first frequency domain blocks of respective frequency coefficients;

filter the first frequency domain blocks using a plurality of filters to develop respective second frequency domain blocks, the second frequency domain blocks having a reduced number of frequency coefficients with respect to the first frequency domain blocks;

group frequency coefficients of the second frequency domain blocks to form frequency coefficient segments;

select a plurality of the frequency coefficient segments as representing the unidentified media program; and compare the selected frequency coefficient segments of the unidentified media program to entries in a database of selected frequency coefficient segments that have been identified to relate to a media program to identify thereby the unidentified media program.

13. The apparatus of claim 12, wherein a grouping of frequency coefficients of the second frequency domain blocks to form a respective one of the frequency coefficient segments includes second frequency domain blocks that are consecutive in time in the unidentified media program.

14. The apparatus of claim 12, wherein the selected frequency coefficient segments correspond to portions of the unidentified media program that are not contiguous in time.

15. The apparatus of claim 12, wherein the plurality of filters includes at least a set of triangular filters or at least a set of log-spaced triangular filters.

16. The apparatus of claim 12, wherein the selected frequency coefficient segments are those that have largest minimum segment energy.

17. The apparatus of claim 12, wherein the selected frequency coefficient segments are selected in accordance with prescribed constraints such that the selected frequency coefficient segments are separated by a minimum distance.

18. The apparatus of claim 12, wherein the selected frequency coefficient segments are selected to contain portions of the unidentified media program that correspond in time to prescribed search windows that are separated by gaps.

19. The apparatus of claim 12, wherein the selected frequency coefficient segments are those having a maximum entropy.

20. The apparatus of claim 12, wherein the processor is configured to:

normalize frequency coefficients forming the selected frequency coefficient segments.

21. The apparatus of claim 12, wherein the processor is configured to:

compare the selected frequency coefficient segments of the unidentified media program to entries in the database to determine corresponding matching scores; and identify the unidentified media program based on the matching scores.

* * * * *